(12) United States Patent
Osterkamp et al.

(10) Patent No.: US 11,533,318 B1
(45) Date of Patent: Dec. 20, 2022

(54) SYSTEMS AND METHODS FOR LOCATION BASED AUTHENTICATION

(71) Applicant: United Services Automobile Association (USAA), San Antonio, TX (US)

(72) Inventors: Bryan J. Osterkamp, New Braunfels, TX (US); Ryan Thomas Russell, San Antonio, TX (US); Jon D. McEachron, Boerne, TX (US); Gregory B. Yarbrough, San Antonio, TX (US); Janelle Denice Dziuk, Falls City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 195 days.

(21) Appl. No.: 17/039,622

(22) Filed: Sep. 30, 2020

Related U.S. Application Data

(60) Provisional application No. 62/908,244, filed on Sep. 30, 2019.

(51) Int. Cl.
*H04L 9/40* (2022.01)
(52) U.S. Cl.
CPC ........ *H04L 63/107* (2013.01); *H04L 63/0876* (2013.01); *H04L 63/102* (2013.01)
(58) Field of Classification Search
CPC .. H04L 63/107; H04L 63/0876; H04L 63/102
See application file for complete search history.

(56) References Cited

U.S. PATENT DOCUMENTS

| 7,801,055 | B1* | 9/2010 | Blair | H04M 3/5175 |
| | | | | 379/265.06 |
| 10,535,072 | B1* | 1/2020 | Le Chevalier | G06Q 30/0269 |
| 10,645,191 | B1* | 5/2020 | Mehta | H04L 67/10 |
| 10,972,458 | B1* | 4/2021 | Gaeta | G06F 21/32 |
| 11,232,187 | B2* | 1/2022 | Bruno | H04L 63/0853 |
| 2015/0220713 | A1* | 8/2015 | Beenau | G06Q 20/4014 |
| | | | | 726/19 |
| 2017/0199998 | A1* | 7/2017 | Bruno | G06F 21/34 |
| 2018/0012427 | A1* | 1/2018 | Ricci | H01Q 1/3283 |
| 2019/0036940 | A1* | 1/2019 | Balakrishnan | H04L 63/12 |

* cited by examiner

*Primary Examiner* — Harris C Wang
(74) *Attorney, Agent, or Firm* — Fletcher Yoder, P.C.

(57) ABSTRACT

Various embodiments described herein relate to a call management system that aims to provide a more efficient, secure, and dynamic technique for authenticating a user based on a location of the user. A server of the call management system receives a phone call from a user device. The server transfers the phone call to an analyst device. When the analyst device accepts the phone call, the server starts an electronic communication session between the user device and the analyst device. The server then determines a current location of the user. The server further determines a question for authentication of the user based on the current location. The server transmits the question to the analyst device. The analyst device transmits the question to the user device via the server. In response to an answer received from the user device, the server authenticates the user.

20 Claims, 3 Drawing Sheets

SYSTEMS AND METHODS FOR LOCATION BASED AUTHENTICATION

CROSS-REFERENCE TO RELATED APPLICATION

This application claims priority to and benefit of U.S. Provisional Patent Application Ser. No. 62/908,244, titled "SYSTEMS AND METHODS FOR LOCATION BASED AUTHENTICATION," filed on Sep. 30, 2019, the entirety of which is incorporated by reference into the present disclosure.

TECHNICAL FIELD

The present application relates generally to authentication methods and systems.

BACKGROUND

An analyst at a call center may authenticate a user prior to providing any services. Typically, the user is authenticated using traditional query-directed techniques, which may involve asking for personal information. The query-directed techniques use a limited number of personal information questions that are static. The personal information questions may include queries related to account numbers, social security number, etc. The user must provide an appropriate answer to each personal information question in order to be authenticated.

Sometimes during a communication session between the user and the analyst, the user may not desire to share personal information, such as the social security number with the analyst due to various reasons. For instance, when the user is participating in the communication session from a workplace location, several people may be present near the user. In such a situation, the user may not want to share his/her personal information with the analyst as other people may overhear the user s responses.

The traditional query-directed techniques have fixed configurations and rules, which may be hard coded in a software application that may implement user authentication systems at the call center. Accordingly, the traditional query-directed techniques are unable to accommodate real-time changing situations associated with the user to provide different user authorization requirements depending upon on a current situation of the user.

SUMMARY

For the aforementioned reasons, there is a need to provide a call management system that may accommodate real-time changing situations associated with a user during an authentication process of the user. A server of the call management system may execute a location based authentication technique for providing one or more user authentication questions based on a current location of the user. The dynamically generated questions may be provided to an analyst for verification of the user while the analyst and the user are participating in an electronic communication session (e.g., during a call between the user and the analyst).

Methods and systems described herein may provide an alternative query-directed technique, which may use a dynamic set of user authentication questions for verification of a user during an electronic communication session between the user and an analyst. Initially, a server may determine a current location of a user device used by the user when the user is in communication with the analyst. The server may then execute the query-directed technique to determine a set of user authentication questions based on the current location of the user for verification of the identity of the user. The set of user authentication questions used by the analyst for verification of the identity of the user may vary depending on the location of the user during the electronic communication session between the user and the analyst.

In one embodiment, a method may include establishing, by a server of a call center, an electronic communication session between a user device operated by a user and an analyst device, wherein the server determines a unique device identifier associated with the user device participating in the electronic communication session; upon establishing the electronic communication session, automatically triggering, by the server, a query via a communication application running on the user device for a current location of the user device; retrieving, by the server from a database, a user profile associated with the user device having the unique device identifier, wherein the user profile comprises a predetermined location associated with the user; determining, by the server, whether the current location of the user device corresponds with the predetermined location within the user profile; when the current location of the user device corresponds with the predetermined location within the user profile, transmitting, by the server, a first credentials prompt for display on the analyst device during the electronic communication session; when the current location of the user device does not correspond with the predetermined location within the user profile, transmitting, by the server, a second credentials prompt for display on the analyst device during the electronic communication session; and authenticating, by the server, the user in response to determining that a set of purported credentials inputted in the analyst device in response to the first or the second credentials prompt match a set of credentials stored within the user profile.

In another embodiment, a system may include a server of a call center configured to establish an electronic communication session between a user device operated by a user and an analyst device, wherein the server determines a unique device identifier associated with the user device participating in the electronic communication session; upon establishing the electronic communication session, automatically trigger a query via a communication application running on the user device for a current location of the user device; retrieve from a database a user profile associated with the user device having the unique device identifier, wherein the user profile comprises a predetermined location associated with the user; determine whether the current location of the user device corresponds with the predetermined location within the user profile; when the current location of the user device corresponds with the predetermined location within the user profile, transmit a first credentials prompt for display on the analyst device during the electronic communication session; when the current location of the user device does not correspond with the predetermined location within the user profile, transmit a second credentials prompt for display on the analyst device during the electronic communication session; and authenticate the user in response to determining that a set of purported credentials inputted in the analyst device in response to the first or the second credentials prompt match a set of credentials stored within the user profile.

BRIEF DESCRIPTION OF THE DRAWINGS

Non-limiting embodiments of present disclosure are described by way of example with reference to accompanying figures, which are schematic and are not intended to be drawn to scale. Unless indicated as representing background art, the figures represent aspects of the present disclosure.

DETAILED DESCRIPTION

Figure 1:
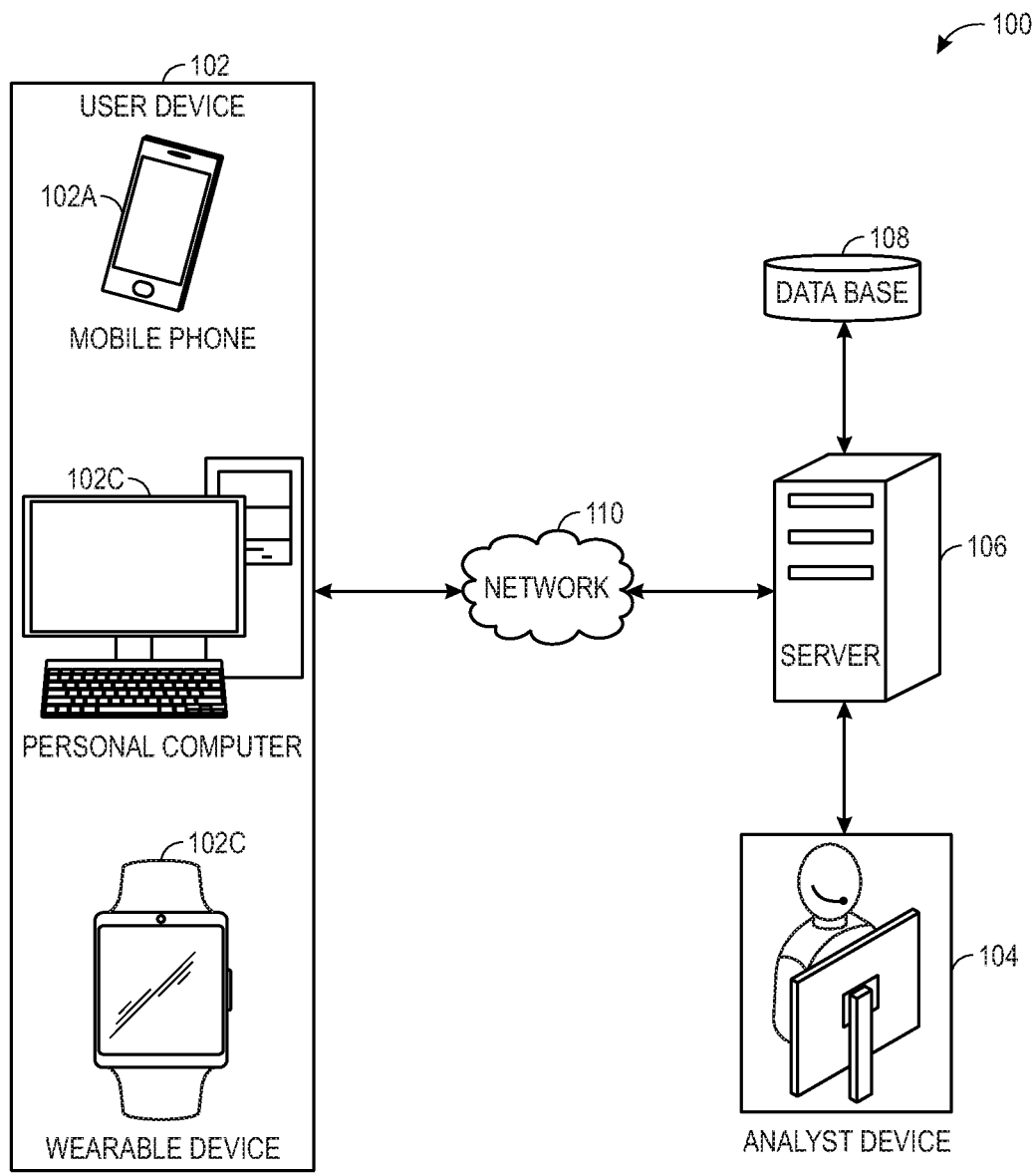
FIG. 1 illustrates an example of a call management system, according to an embodiment.

Reference will now be made to the embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here.

FIG. 1 illustrates an example of a call management system 100 operated by a company. Non-limiting examples of the company may include a bank, an insurance provider, a software company, a retail company, a manufacturer, and a professional services company. The call management system 100 may include various devices, such as a user device 102, an analyst device 104, a server 106, and a database 108. The user device 102 may be a mobile phone 102a. The user device 102 may be a personal computer 102b. The user device 102 may be a wearable device 102c.

The call management system 100 is described in a context of computer-executable instructions, such as program modules, being executed by server computers, such as the server 106. The server 106 may operate various software programs and applications, such as a communication application, a call management application, and an authentication application. The analyst device 104 may install and execute the call management application and the authentication application. The call management application and the authentication application may include programs, objects, components, data structures, etc., which may perform particular call management and user authentication tasks. The user device 102 may install and execute the communication application. The communication application may include programs, objects, components, data structures, etc., which may perform particular communication tasks. The features of the call management system 100 may be practiced either in a single computing device, or in a distributed computing environment, where various tasks may be performed by processing devices, which are linked through a network 110. In the distributed computing environment, the various program modules may be located in both local and remote computer storage media including memory storage devices.

The user device 102, the analyst device 104, the server 106, the database 108, and various other devices of the call management system 100 may communicate with each other over the network 110. The network 110 may include, but is not limited to, a private or public local area network, a wireless local area network, a metropolitan area network, a wide-area network, and Internet. The network 110 may further include both wired and wireless communications according to one or more standards via one or more transport mediums. The communication over the network 110 is in accordance with various communication protocols, such as transmission control protocol, internet protocol, user datagram protocol, and institute of electrical and electronics engineers communication protocols. The network 110 may further include wireless communications according to Bluetooth specification sets, or another standard or proprietary wireless communication protocol. The network 110 may further include communications over a cellular network, including, for example, a global system for mobile communications, code division multiple access, and enhanced data for global evolution network. The network 110 may further include hardware devices (e.g., routers, switches, firewalls) and software components configured to relay data communications between different computing devices and applications associated with the call management system 100.

In operation, a user using the user device 102 may desire to access a service from the analyst device 104. The user device 102 may then try to connect with the analyst device 104 via one or more communication channels (for example, a phone call, an internet call, etc.) over the network 110 to start an electronic communication session. The network 110 may be a public switched telephone network, an Internet Protocol network, a wireless network, or any combination of these networks. The analyst device 104 may accept a request for the electronic communication session received from the user device 102. When the electronic communication session is started over a first communication channel (for example, a phone call), the analyst device 104 via the server 106 may authenticate the call received from the user device 102. A first step of the call authentication may include obtaining information, such as a unique device identifier associated with the user device 102 that can be used to determine a user profile of the user. The server 106 may determine the unique device identifier and then use the unique device identifier to retrieve the user profile of the user from the database 108. The user profile may include a user name, a user identifier, and a list of predetermined locations, such as a residence location of the user, a workplace location of the user, etc. The server 106 may present the user profile on a graphical user interface of the analyst device 104 during the electronic communication session.

The server 106 may cause execution of a communication application running on the user device 102 to determine a current location of the user device 102. The server 106 may receive the current location of the user device 102 from the communication application. The server 106 may determine whether the current location of the user device 102 may correspond with any location within the list of predetermined locations. When the server 106 determines that the current location of the user device 102 may correspond with a first predetermined location (for example, the workplace location of the user) present in the list of predetermined locations, the server 106 may select a first authentication question from the database 108 for verification of an identity of the user. The first authentication question may be a question related to non-personal information associated with the user (for example, a name of first music concert attended). In one example, when the user in a workplace, the server 106 may select the first authentication question for the verification of the identity of the user because an answer to the first authentication question does not require disclosure of personal and sensitive information of the user as colleagues of the user may overhear the answer during the electronic communication session. Similarly, when the server 106 determines that the current location of the user device 102 may correspond with a second predetermined location (for example, the residence location of the user) present in the list of predetermined locations, the server 106 may select a second authentication question from the database 108 for verification of the identity of the user. The second authentication question may be a question related to personal information associated with the user (for example, a social security number). In one example, when the user is at a private location such as a home, the server 106 may select the second authentication question for the verification of the identity of the user as the user can provide personal and sensitive information as an answer to the second authentication question without anyone overhearing the personal and sensitive information.

The server 106 may present an authentication question (for example, the first authentication question, the second authentication question, or any other authentication question) on the graphical user interface of the analyst device 104 depending on a result of matching of the current location of the user device 102 with the list of predetermined locations. The analyst device 104 may transmit the authentication question to the user device 102 via the server 106. The user device 102 may receive the authentication question. The user device 102 may transmit an answer to the authentication question to the analyst device 104 via the server 106. The server 106 may execute a comparison protocol to compare the answer received from the user device 102 with a predetermined answer to the authentication question stored in the database 108. When the answer received from the user device 102 matches the predetermined answer, the server 106 may authenticate the user. The server 106 may present a result of the authentication of the user on the graphical user interface of the analyst device 104. The analyst device 104 may provide the services to the user device 102 when the user is successfully authenticated.

The server 106 may determine a set of offers for the user based on the user profile and the current location of the user device 102. The set of offers may include a recommendation for one or more products. The server 106 may generate a set of instructions based on the user profile and the current location of the user device 102. The set of instructions may include a time limit for the analyst device 104 for communicating the set of offers to the user device 102 during the electronic communication session. The server 106 may present the set of offers and the set of instructions on the graphical user interface of the analyst device 104. The analyst device 104 may communicate the set of offers to the user device 102 using the set of instructions via the first communication channel during the electronic communication session. In some instances, the analyst device 104 may communicate the set of offers to the user device 102 via a second communication channel (for example, a text notification) during the electronic communication session. The user device 102 may receive the text notification, which may include information associated with the set of offers.

A user device 102 is a computing device including a processing unit. The processing unit may include a processor with a computer-readable medium, such as a random access memory coupled to the processor. The user device 102 may be running algorithms or computer executable program instructions, which may be executed by a single processor or multiple processors in a distributed configuration. The user device 102 may interact with one or more software modules of a same or a different type operating within the call management system 100.

Non-limiting examples of the processor may include a microprocessor, an application specific integrated circuit, and a field programmable object array, among others. Non-limiting examples of the user device 102 may include the mobile phone 102a (e.g., a smartphone, PDA), the personal computer 102b (e.g., a tablet device), and the wearable device 102c (e.g., a smartwatch, a pair of glasses). The user device 102 may be operated by the user. The user may refer to both an individual calling into a call center for information or to access the available services and the individual who is called by the call center. For ease of explanation, the FIG. 1 show a single computing device functioning as the user device 102. However, some embodiments may include a plurality of computing devices capable of performing tasks described herein.

The user device 102 may include one or more input and output devices configured to allow user interaction with one or more programs on the user device 102 to communicate with the analyst device 104 and the server 106. In one instance, the user may use the user device 102 to initiate communication with the analyst device 104 via one or more communication channels. The communication channels may host data communications between the user device 102 and the analyst device 104. The data communications may be any data transfer between the user device 102 and the analyst device 104 capable of communicating audio and other data over the network 110. The communications channels may be a collection of hardware systems and software applications that may host the data communications of each particular channel. Non-limiting examples of the communications channels may include a computer contact channel, a telecommunications channel, among others. In the call management system 100, the communications channels may be characterized by a nature of the data communications expected for each particular channel. For example, the telecommunications data channel may include hardware and software components configured to host the data communications, such as interactive voice response relays and inputs, or short message service texts, which are transmitted to the analyst device 104 via the server 106 that host components of a telephony unit. However, it should be understood that the communication channels may be established based on any criteria for determining which hardware and software components should handle the data communications received from disparate systems and engendered in different formats. As such, the communication channels of the call management system 100 are merely intended as examples, and additional or alternative communication channels may be included, to support the additional or alternative software applications and hardware devices that would be associated with those additional or alternative communication channels.

The user device 102 may include a client-side communication application from which the user may initiate the communication with the analyst device 104 via the one or more communication channels. The communication application may be a software stack running on an operating system of the user device 102. The communication application may have a protocol layer and a user interface layer where each layer may be responsible for specific functions. The protocol layer of the communication application may communicate with the operating system of the user device 102 and manages the connections of the user device 102 over the communication network 110. The protocol layer may communicate with the user interface layer. The protocol layer may be arranged to control the user interface layer, and to present information to the user via a user interface of the communication application and to receive information from the user via the user interface of the communication application.

In order to access the communication application on the user device 102, the user device 102 may transmit communication application credentials of the user via user inputs to the server 106, from which the server 106 may validate the user. The user device 102 may include a number of input devices (e.g., a keyboard, a touchscreen, and a stylus) to receive the user inputs, including various types of credentials and data inputs allowing for validation, e.g., username, passwords, certificates, biometrics. When the server 106 validates the user, the user may have access to features of the communication application running on the user device 102. The user device 102 may directly initiate a phone call to the analyst device 104 or make a request via the communication application to start the electronic communication session.

The user device 102 may include an interactive graphical user interface on which the user may interact with the communication application by means of the input device. The interactive graphical user interface via the communication application may present notifications to the user, which are received by the server 106 and/or the analyst device 104. The communication application may display interactive icons or buttons on the interactive graphical user interface. The triggering of the icons may generate a screen having a plurality of portions on the interactive graphical user interface. A first portion of the screen may present a description associated with the notifications. The description of the notifications may include secondary authentication questions, transaction information associated with an account of the user, one or more promotional products, one or more marketing deals etc. The user, via the user device 102, may transmit a message reply from a second portion of the screen to the server 106 or the analyst device 104 in response to the notifications. The second portion of the screen may provide a brief text box (for example, a text box with a pre-defined number of characters) having an expandable text capture capability to capture user's explanation of the message reply to the notifications. The message reply may include an answer to the secondary authentication question. The message reply may further include an answer regarding a purchase of a particular promotional product being offered to the user.

A server 106 is a computing device. The server 106 may include a processing unit and a non-transitory machine-readable storage medium. The processing unit may include a processor with a computer-readable medium, such as a random access memory coupled to the processor. The server 106 may be executing algorithms or computer executable program instructions, which may be executed by a single processor or multiple processors in a distributed configuration. The server 106 may be configured to interact with one or more software modules of a same or a different type operating within the call management system 100.

Non-limiting examples of the processor may include a microprocessor, an application specific integrated circuit, and a field programmable object array, among others. The server 106 is capable of executing various call management and authentication tasks. Non-limiting examples of the server 106 may include a desktop computer, a server computer, a laptop computer, a tablet computer, and the like. For ease of explanation, the FIG. 1 shows a single server computing device functioning as the server 106. However, some embodiments may include a plurality of server computing devices capable of performing the call management and authentication tasks described herein.

The server 106 may be coupled to the user device 102, the database 108, and the analyst device 104 via the network 110. When a web connection or the electronic communication session is started between various devices of the call management system 100, the server 106 is able to receive data from the database 108 as well as any information from the user device 102 and the analyst device 104. At the same time, the server 106 is able to transmit the data to the user device 102 and the analyst device 104. The analyst device 104 may receive the data from the server 106 via the call management application running on the analyst device 104. The user device 102 may receive the data from the server 106 via the communication application running on the user device 102. The data may include notifications and messages.

The server 106 may generate a contact record in response to receiving data communications through a communication channel enabling the electronic communication session between the user device 102 and the analyst device 104. The contact record may indicate a party (e.g., the user) who initiated the contact with the analyst via a phone call or some other medium, as well as other information related to the contact (e.g., a time, a date, and a type of the communication channel). The contact record may be automatically generated when the data communication received through the communication channel is detected in a queue associated with the analyst. The server 106 may store the contact record in the database 108.

The server 106 may receive a data record directly from the user device 102 prior to starting of any electronic communication session with the analyst device 104 or during the electronic communication session with the analyst device 104. In another embodiment, the server 106 may receive the data record indirectly from the user device 102, for example, via the analyst device 104 during the electronic communication session. In yet another embodiment, the server 106 may generate and execute a request to obtain the data record from the user device 102 during the electronic communication session. The data record may include at least the unique device identifier associated with the user device 102, among other information associated with the user device 102. The server 106 may store the data record received from the user device 102 or the analyst device 104 in the database 108. The unique device identifier associated with the user device 102 may be a phone number of the user device 102. The unique device identifier associated with the user device 102 may be a unique device identification number of the user device 102. The unique device identifier associated with the user device 102 may be a model number of the user device 102. The unique device identifier associated with the user device 102 may be a serial number of the user device 102. The unique device identifier associated with the user device 102 may be IMEI number of the user device 102. The unique device identifier associated with the user device 102 may be an account number of the user. The unique device identifier associated with the user device 102 may be an email address of the user.

The server 106 may retrieve a user profile of the user operating the user device 102 from the database 108 using the unique device identifier. The user profile may include information associated with the user, such as a name of the user, an age of the user, a gender of the user, insurance policies owned of the user, bank accounts of the user, transaction records of the user, hobbies of the user, personal interests of the user, an occupation of the user, verification preferences of the user for different locations, social networking accounts of the user, and a list of predetermined locations, such as a workplace address and a residential address.

The server 106 may determine a current location of the user device 102 upon receiving the phone call from the user device 102. Based on the current location of the user device 102, the server 106 may assign a priority to the incoming phone call from the user device 102. In one instance, when the server 106 determines that the user is calling from their workplace location, the server 106 may place the incoming phone call in the queue associated with the analyst and assign a top priority to the incoming phone call within the queue. In another instance, when the server 106 determines that the user is calling from their personal home, the server 106 may assign no priority to the incoming call and the incoming call may be placed last in the queue associated with the analyst.

The server 106 may use one or more wireless signals emitting from the user device 102 to determine the current location of the user device 102. The server 106 may use global positioning system (GPS) sensor placed in the user device 102 to determine the current location of the user device 102. The server 106 may use a Wi-Fi location module to determine the current location of the user device 102. The server 106 may use a cellular location module to determine the current location of the user device 102. The server 106 may use cell-tower-triangulation to determine the current location of the user device 102. The server 106 may use a plurality of beacons placed at multiples sites to determine the current location of the user device 102.

The server 106 may determine the current location of the user device 102 during the electronic communication session between the user device 102 and the analyst device 104. The server 106 may determine the current location of the user device 102 using the communication application running on the user device 102. The server 106 may generate and transmit instructions to execute the communication application to initiate a process to determine the current location of the user device 102. The server 106 via the communication application may activate the GPS sensor if the GPS sensor is not already active. The server 106 via the communication application may monitor GPS signals using the GPS sensor. The server 106 via the communication application may receive the GPS signals. The server 106 may use the GPS signals to determine the current location of the user device 102. The server 106 via the communication application may use an electronic filter to combine location data associated with the user device 102 obtained using the GPS sensor and another system, such as the cell-tower-triangulation in order to obtain a more accurate current location of the user device 102. The server 106 may store information associated with the current location of the user device 102 in a latitude/longitude format in the database 108.

The server 106 may continuously determine the location of the user device 102 in real time using the communication application running on the user device 102. In some embodiments, the server 106 may continuously receive the location of the user device 102 in real time from the user device 102 via the communication application even when there is no electronic communication session happening between the user device 102 and the analyst device 104. The user device 102 may stream its location information periodically such as, every few seconds, or every few minutes. In alternative embodiments, the user device 102 may continuously record its location information in its internal memory and then periodically transmit the location information to the server 106. The user device 102 may be able to select between streaming its location information to the server 106 and periodically transmitting recorded location information to the server 106. The user device 102 may select depending on current wireless signal conditions. For instance, when the user device 102 is on a high-speed data network, the user device 102 may elect to stream its location information and possibly transmit a relatively large data packet of previously recorded location information to the server 106. If the user device 102 is on a slower speed data network, then the location information of the user device 102 may be sent less periodically and records that are more detailed kept in the internal memory on the user device 102 that are sent to the server 106 when a higher speed data connection is available.

The server 106 may generate a location profile of the user device 102 by storing a sequence of locations visited by the user device 102 over a predetermined period of time using location information history associated with the user device 102. The sequence of locations in the location profile of the user device 102 may be augmented with information including, for example, a type of each location, an amount of time spent at each location, a time of day, a date, and/or any related activity that may be identified from the user device 102. The server 106 may store the location profile of the user device 102 in the database 108.

The server 106 may execute a geolocation algorithm to determine the current location of the user device 102 during the electronic communication session between the user device 102 and the analyst device 104. The geolocation algorithm may use an Internet Protocol address (IP address) of the user device 102 as an input to determine the current location of the user device 102. For this purpose, the server 106 may first determine the IP address of the user device 102. In one embodiment, the server 106 may determine the IP address of the user device 102 from a webserver. The webserver may determine the IP address of the user device 102 based on a web activity done from the user device 102. The web activity may include accessing the communication application running on the user device 102. In another embodiment, the server 106 may determine the IP address of the user device 102 from the user profile of the user. The user profile may store the IP address of the user device 102 being operated by the user. The IP address may have two parts, such as a particular network identifier and a specific device identifier. The IP address may be a 32-bit number that identifies the user device 102.

The server 106 may use the IP address of the user device 102 to search the database 108. The database 108 may include a table that is helpful for geolocation services. The table may include pairing information between the IP addresses and corresponding geographical locations. The table may include information obtained from various regional internet registries. The table may also include the information provided by various internet service providers. Using the information in the database 108, the server 106 is able to use the IP address of the user device 102 to determine the approximate current location of the user device 102. The approximate current location may include information associated with a current city and a current neighborhood. The server 106 may store information associated with the approximate current location of the user device 102 in the database 108.

The server 106 may determine browsing history of the user on the user device 102 for a predetermined period of time using the communicating application running on the user device 102. The server 106 may also determine the browsing history of the user on one or more computing devices, which are wired or wirelessly linked to the user device 102 for the predetermined period of time. The server 106 may transmit instructions to the webserver to determine and transmit the browsing history of the user on the user device 102 and other computing devices for the predetermined period of time. The webserver may determine a list of websites being accessed by the user on the user device 102 and other computing devices over the predetermined period of time. The webserver may further determine a list of products being searched by the user on various websites over the predetermined period of time. The webserver may further determine a list of articles being read by the user on various websites over the predetermined period of time. The webserver may process the information associated with the list of the products, the list of the articles, and the list of the websites to generate a research history report corresponding to the user. The webserver may transmit the research history report to the server 106. The server 106 may store the research history report in the database 108.

The server 106 may execute one or more authentication algorithms to process the information associated with the user profile, the location profile, the research history report, and/or the current location of the user device 102 to generate one or more authentication questions for verification of an identity of the user during the electronic communication session. In one non-limiting example, the server 106 may generate the second authentication question based on the processing of the information, such as the current location of the user device 102. The current location of the user device 102 may be a residence location of the user. The second authentication question may be a question related to the personal information of the user. The personal information may include an account number, a passport number, and a social security number of the user. The server 106 may generate the second authentication question for verification of the identity of the user when the user is participating in the electronic communication session from the home location because then the user may be able to provide personal information as an answer to the second authentication question without worrying about anyone overhearing the personal information. In another non-limiting example, the server 106 may generate the first authentication question based on the processing of the information, such as the current location of the user device 102. The current location of the user device 102 may be a workplace location of the user. The first authentication question may be a question related to non-personal information of the user. The non-personal information may include fathers name, mother's name, year of birth, and year of opening an account with the company. The server 106 may generate the first authentication question for the verification of the identity of the user when the user is participating in the electronic communication session from the workplace location because an answer to the first authentication question does not require disclosure of the personal information of the user as workplace colleagues of the user that may be around the user during the electronic communication session may overhear the answer.

The server 106 may execute one or more selection algorithms to analyze the information associated with the user profile, the location profile, the research history report, and/or the current location of the user device 102. The server 106 may select one or more authentication questions from a list of authentication questions stored in the database 108 based on analysis of the information. The database 108 may store a table having a pairing and a relationship between different authentication questions and different predetermined locations associated with the user. The server 106 may generate the table taking into account privacy concerns of the user when the user is at different predetermined locations. For instance, the authentication question in the table may be related to non-personal information of the user when the user is in a public place whereas the authentication question in the table may be related to personal information of the user when the user is in a private place. The server 106 may execute one or more machine learning algorithms to generate the table using inputs from the user device 102 as a training dataset for the one or more machine learning algorithms. The server 106 may match the current location of the user with the list of the predetermined locations stored in the table. Based on the results of the matching, the server 106 may select the one or more authentication questions from the database 108.

In one non-limiting example, a first predetermined location, such as a workplace of the user mentioned in the table may be associated with a first authentication question, such as a question related to last three transactions performed by the user. When the server 106 determines that the current location of the user is the workplace location of the user, the server 106 may the select the first authentication question for performing the authentication of the user. In another non-limiting example, a second predetermined location, such as a residence of the user mentioned in the table may be associated with a second authentication question, such as a question related to a social security number of the user. When the server 106 determines that the current location of the user is the residence location of the user, the server 106 may the select the second authentication question for performing the authentication of the user.

The server 106 may generate a record of the one or more authentication questions selected for performing the authentication of the user during the electronic communication session. The server 106 may store the record of the one or more authentication questions selected for performing the authentication of the user in the database 108. The server 106 may transmit the one or more authentication questions selected for performing the authentication of the user along with the unique device identifier to the analyst device 104. In some embodiments, the server 106 may transmit the one or more authentication questions selected for performing the authentication of the user to the user device 102 via the analyst device 104.

The server 106 may receive answers for the one or more authentication questions from the user device 102. In some embodiments, the server 106 may receive the answers for the one or more authentication questions obtained from the user device 102 via the analyst device 104. After receiving the answers, the server 106 may match the answers provided by the user for the one or more authentication questions with answers to a same set of one or more authentication questions previously provided by the user, which are presently stored in the database 108. The server 106 upon determining that current answers provided by the user for the one or more authentication questions matches with the previously provided and verified answers by the user for the same set of one or more authentication questions, the server 106 may authenticate the user. The server 106 may present a result of the authentication of the user on the graphical user interface of the analyst device 104.

When the server 106 determines that the current answers provided by the user for the one or more authentication questions does not match with the previously provided and verified answers by the user for the same set of one or more authentication questions, the server 106 may generate and transmit one or more secondary authentication questions to the user device 102 via any communication channel. When the user provides a correct answer for each of the one or more secondary authentication questions, the server 106 may authenticate the user.

The server 106 may selectively record conversations, such as audio and text chats between the user of the user device 102 and the analyst of the analyst device 104 during the electronic communication session. The server 106 may store the conversations in the database 108 together with data presented on the graphical user interface of the analyst device 104. While all the conversations between the user device 102 and the analyst device 104 may be recorded in their entirety, the server 106 may only store a small portion of the conversations in the database 108 to save space in the database 108. The server 106 may subsequently review only a portion of the conversations stored in the database 108 based on a set of rules. The server 106 may further review any data entered by the user through a key pad on the user device 102 during the electronic communication session. The server 106 may further review the screens viewed by the analyst operating the analyst device 104 during the electronic communication session. The server 106 may determine any possible training needs for the analyst operating the analyst device 104 based on a result of the review process.

An analyst device 104 may be a portable or a non-portable electronic device. The analyst device 104 may include processors, which may be configured to perform one or more operations according to one or more programming instructions. The analyst device 104 may be capable of communicating with the server 106 and the user device 102 through the network 110 using the wired or wireless communication capabilities. Non-limiting examples of the analyst device 104 may include a computer (e.g., a mobile phone, a laptop, and a tablet).

The analyst device 104 may receive records of incoming message requests and incoming call requests sent from the user device 102 via the server 106 based on a subject matter (e.g., a type of a request) or a procedural role (e.g., a time-sensitive request) associated with respective analyst operating the analyst device 104. In some implementations, the records of the incoming call requests may have one data field indicating a nature of the request and a second data field indicating a time-sensitive nature or a user-sensitive nature of the request. Based on the data fields associated with the records of the incoming call requests, the analyst device 104 may receive the records of the incoming call requests having subject matter or procedural data fields associated with respective analyst credentials. The server 106 may store the records of the incoming call requests in a queue associated with the analyst.

The analyst device 104 may include one or more input and output devices, which may allow the analyst to process and accept incoming voice calls and messages from the user device 102. The analyst device 104 may execute a call management application, which may allow the analyst to select a record associated with an incoming call from the queue that is assigned to the analyst, and then review or update underlying information associated with the record. In one non-limiting example, the analyst device 104 may select a first record of a first incoming call assigned to the analyst device 104 from the queue of the analyst, which may be having a highest priority among records of all other incoming call requests within the queue that are assigned to the analyst device 104. The server 106 may assign a priority score to each incoming call for the analyst based on information in the user profile associated with a phone number of each incoming call. The priority score may prioritize the records of the different incoming call requests within the queue of the analyst. The priority score of the records of the incoming call requests may be continually updated, and thus the prioritization of the incoming call requests within the queue. Based on the priority score associated with each incoming call, the analyst device 104 may present the analyst with the record of the first incoming call, which has to be addressed first.

The analyst device 104 may include a communication interface on which the record of the first incoming call as well as the records of remaining incoming call requests may be presented. The communication interface may be integral with the analyst device 104. The communication interface may be communicatively coupled to the body of the analyst device 104. The communication interface may be communicatively coupled to the body of the analyst device 104 via the direct connection, for example through a cord associated with the body of the analyst device 104 connected to a plug of the communication interface. The communication interface may be communicatively coupled to the body of the analyst device 104 through wireless connection, such as Wi-Fi, Bluetooth, BLE, NFC, or other appropriate short-range communication.

The communication interface may include a display screen. The display screen may be a liquid crystal display, a plasma display, a light emitting diode display, an organic light-emitting diode display, an electronic paper display, or any other suitable type of display able to present digital content thereon. The display screen may include a touch sensor to provide a touchscreen display configured to receive touch inputs for enabling interaction with a user interface presented on the display screen.

The communication interface may present the record of the first incoming call via the call management application. The analyst device 104 may accept the first incoming call from the user device 102, and the electronic communication session is started between the user device 102 and the analyst device 104. During the electronic communication session, the analyst may view the record of the first incoming call presented on the communication interface. The record of the first incoming call may include a user name, a phone number, a device number, a user identifier, a list of predetermined locations presented in the user profile associated with the user, a current location of the user device 102, and a list of authentication questions. The communication interface may be configured for receiving an entry of an input from the analyst before, during, or after the electronic communication session. For instance, the analyst may mark or tag the record of the first incoming call. In some embodiments, the server 106 may mark or tag the record of the first incoming call, and transmit the tagged record of the first incoming call to the analyst device 104 before, during, or after the electronic communication session. The server 106 may execute various data models, which may indicate that the record of the first incoming call request should be tagged. The server 106 may then automatically tag the record of the first incoming call when data fields in the record of the first incoming call matches a threshold number of data fields of a given data model. In one embodiment, the tag may indicate that the user is interested in a particular item or service for purchase. In another embodiment, the tag may indicate pending requests of the user.

A database 108 communicates with the user device 102, the server 106, and the analyst device 104. The database 108 is capable of storing information in a plain format and an encrypted version. The database 108 may be in communication with a processor of the server 106 where the processor is capable of executing the various commands of the call management system 100. The database 108 may be part of the server 106. The database 108 may be a separate component in communication with the server 106.

The database 108 may further store data records associated with various aspects of application services offered to the users. Non-limiting examples of what may be stored in the database 108 may include user records that may include data fields describing users, e.g., user data, such as user credentials (e.g., username, passwords, biometrics, encryption certificates), user profile, user account data, user roles, or user permissions; document records that may comprise machine-readable computer files (e.g., word processing files), parsed portions of such computer files, or metadata associated with computer files; and application data that may include software instructions or data used by various applications (for example, the call management application and the communication application).

The database 108 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions.

Figure 2A:
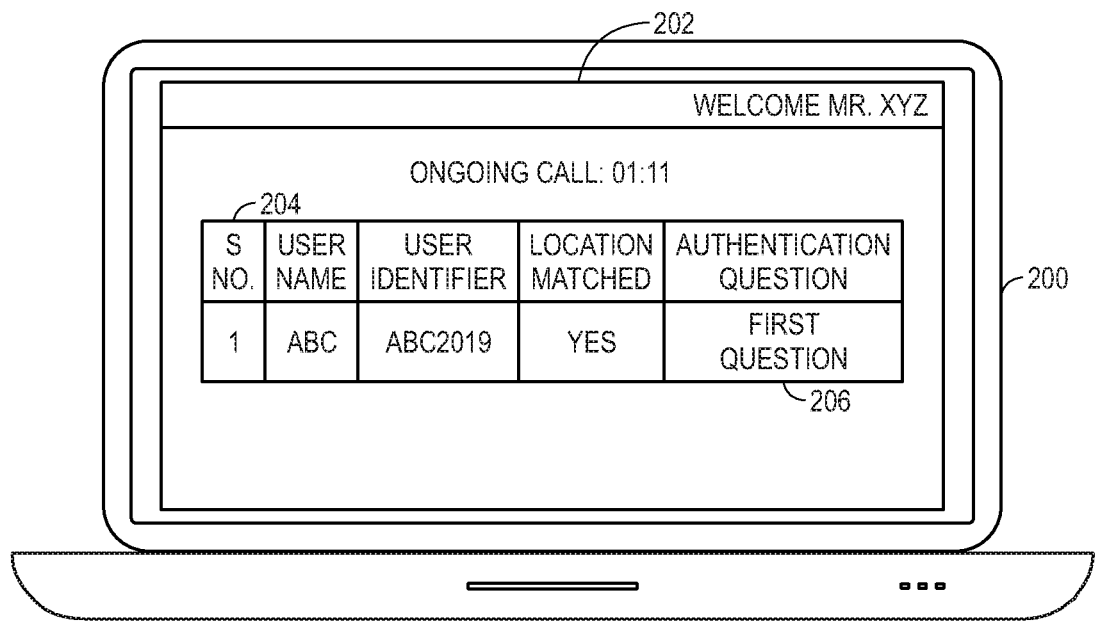
FIG. 2A illustrates a graphical user interface of an analyst device presenting a first question, according to an embodiment.
Figure 2B:
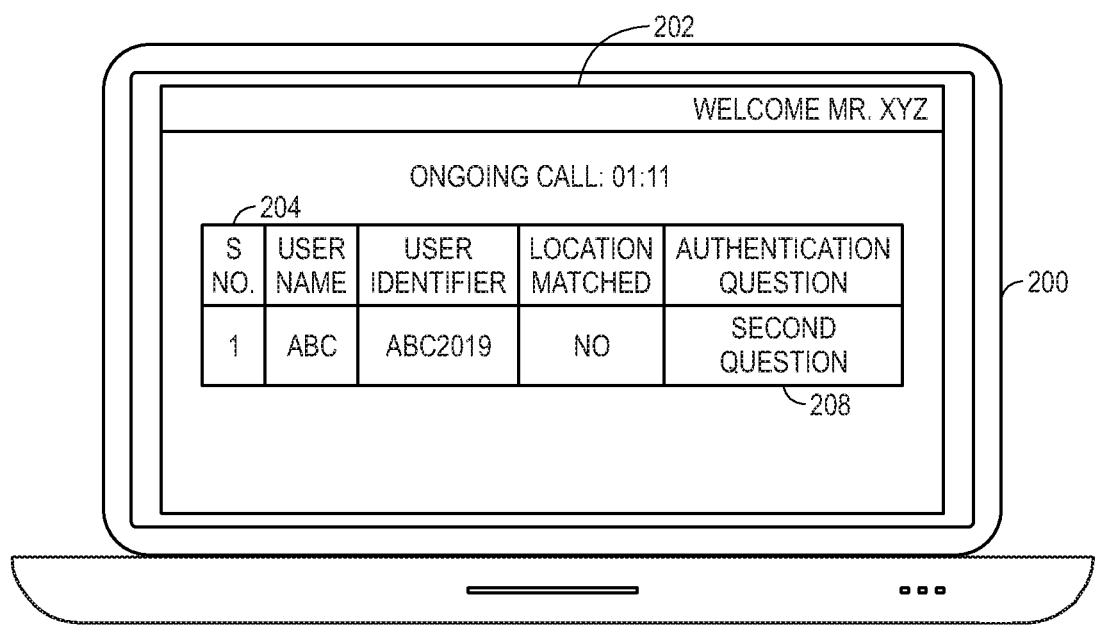
FIG. 2B illustrates a graphical user interface of an analyst device presenting a second question, according to an embodiment.

FIGS. 2A and 2B illustrate an analyst device 200 of a call management system operated by an analyst. The analyst device 200 may be a portable or a non-portable device, such as a laptop, a personal computer, a smart phone, a smart watch, a personal digital assistant, or the like. The analyst device 200 may include a processor, which may perform one or more operations according to one or more programming instructions. The analyst device 200 may be capable of communicating with a server and a user device through a communications network using wired or wireless communication capabilities. The user device is operated by a user.

The analyst device 200 may have an interactive graphical user interface 202. The graphical user interface 202 may be a communication interface. The graphical user interface 202 may be a liquid crystal display, a plasma display, a light emitting diode display, an organic light-emitting diode display, an electronic paper display, or any other suitable type of display able to present digital content thereon. The graphical user interface 202 may include a touch sensor associated with graphical user interface 202 to provide a touchscreen display configured to receive touch inputs for enabling interaction with information presented on the graphical user interface 202.

A call management application may be running on the analyst device 200. The analyst device 200 may have access to pre-stored web-based interfaces, such as webpages associated with the call management application including a number of preconfigured sub-interfaces or containers, which may be dynamically populated. The analyst device 200 may receive records of incoming calls requests from the user of the user device via the call management application. Also, an authentication application may be running on the analyst device 200. The analyst device 200 may have access to pre-stored web-based interfaces, such as webpages associated with the authentication application including a number of preconfigured sub-interfaces or containers, which may be dynamically populated. The analyst device 200 may receive a result of an authentication of the user via the authentication application. The authentication application may be a feature of the call management application. The authentication application may be directly associated with the call management application. The authentication application may be indirectly associated with the call management application via another software application.

The analyst may access the call management application by a common access method, e.g., keying in a URL, etc. In order to provide access to the call management application, the analyst device 200 may require analyst verification based upon a set of analyst credentials (e.g., username, password, biometrics, cryptographic certificate) from the analyst. Upon the submission of the set of analyst credentials from the analyst, the analyst device 200 may access a local memory configured to store the analyst credentials in order to determine whether a set of entered credentials from the analyst purportedly verifying the analyst match an appropriate set of credentials in the local memory that identify and verify the analyst. The analyst device 200 may generate and serve a webpage of the call management application on the graphical user interface 202 based upon the verification of the analyst.

The webpage of the call management application shown on the graphical user interface 202 may present a record 204 of the user participating in an electronic communication session with the analyst. The electronic communication session may be over a telephone call between the user and the analyst. The server may transmit the record 204 of the user to the analyst device 200 prior to the start of the electronic communication session or as soon as the electronic communication session is started. The record 204 may include information associated with the user, such as a user name and a user identifier. The record 204 may further include an authentication question, which may have to be communicated by the analyst device 200 to the user device during an authentication process of the user. The server may determine the authentication question based on a result of matching of a current location of the user device with a predetermined location associated with the user. The predetermined location may be a workplace location of the user.

When the server determines that the user is currently present in the workplace location, a first question 206 may be presented on the graphical user interface 202. The first question 206 may be a question related to non-personal information associated with the user. When the authentication of the user is successful based on an answer received from the user device for the first question 206, the server may further present a first list of advertising products on the graphical user interface 202. The server may select the first list of advertising products from a list of advertising products such that total time it may take to explain the first list of advertising products to the user is within a predetermined amount of time. In one non-limiting example, the first list of advertising products may include a credit card with no annual fee and a home loan with flexible terms. This is because the user is present in the workplace and may have less amount of time to speak with the analyst during the electronic communication session.

When the server determines that the user is currently not present in the workplace location and is probably driving his/her car as the current location of the user is continuously changing, a second question 208 may be presented on the graphical user interface 202. The second question 208 may be a question related to personal information associated with the user. When the authentication of the user is successful based on an answer received from the user device for the second question 208, the server may further present a second list of advertising products on the graphical user interface 202. The server may select the second list of advertising products from the list of advertising products based on one or more interests of the user determined from a user profile. The second list of advertising products may include some products from the first list of advertising products. The second list of advertising products may be different from the first list of advertising products. In one non-limiting example, the second list of advertising products may include a credit card with no annual fee, a home insurance policy, a life insurance policy, a bank account with no monthly fee, and a car loan with flexible terms.

Figure 3:
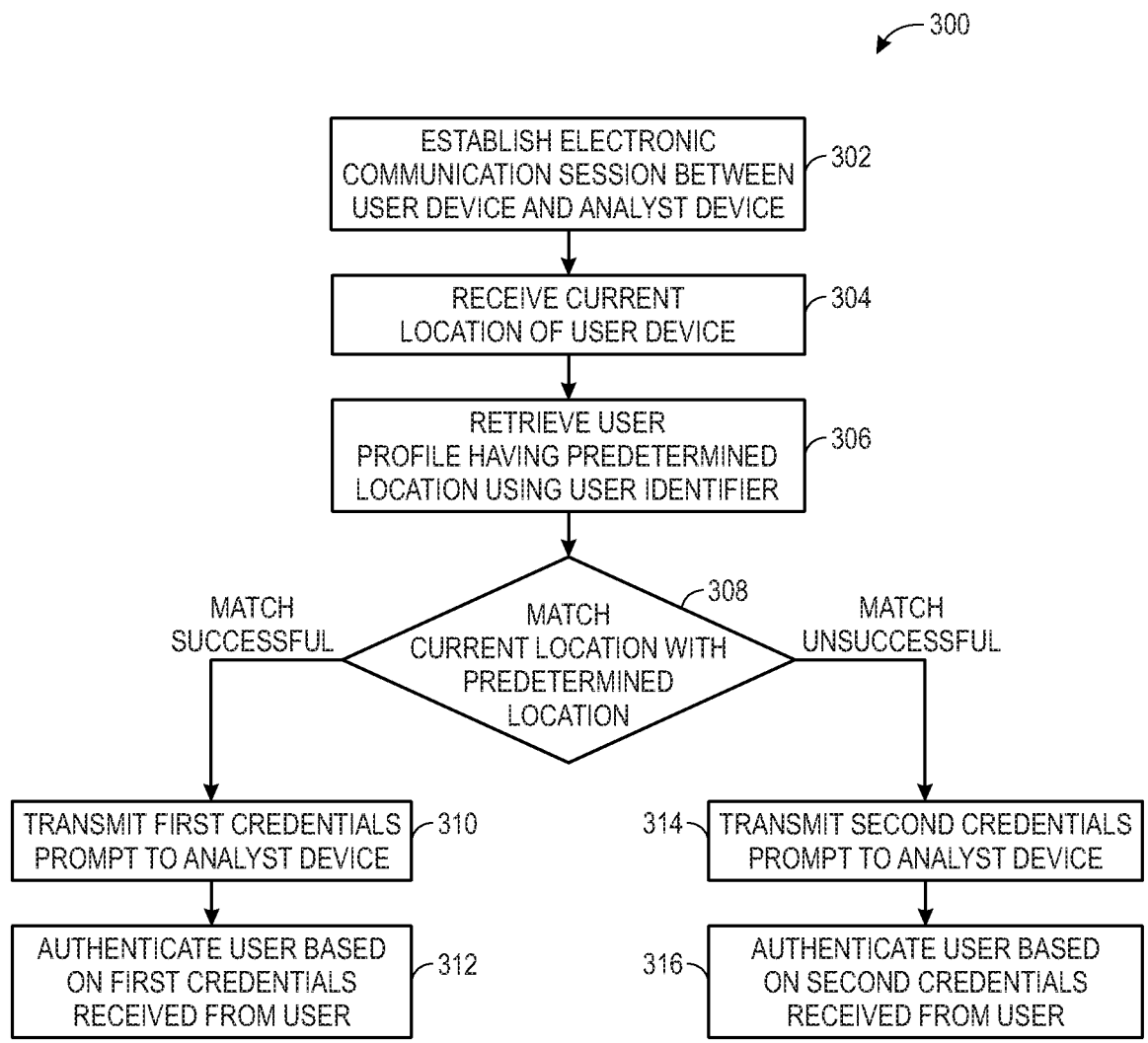
FIG. 3 illustrates a flow diagram of a method for authenticating a user, according to an embodiment.

FIG. 3 shows execution steps of authenticating a user, according to a method 300. The method 300 shown in the FIG. 3 may include execution steps 302, 304, 306, 308, 310, 312, 314, and 316. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a server of a call center in this embodiment. The server executing one or more steps may be programmed to execute various other, unrelated essential features. The steps may also be executed by a plurality of server computing devices operating in a distributed computing environment.

In a first step 302, a user device being operated by a user may communicate with an analyst device being operated by an analyst to start or establish an electronic communication session. The user device may communicate with the analyst device using a communication application. The user device may communicate with the analyst device via a communication channel associated with the communication application. The communication channel may be a telephony channel. For example, the user may use the user device to contact the analyst by placing a call or sending a text message over a telecommunications network associated with the telephony channel. The analyst device may receive the call or the text message along with a unique device identifier associated with the user device over the telecommunications network.

The telephony channel may include hardware and software components capable of hosting and relaying data communications transmitted to the analyst device from the user device. The telephony channel may include the user device, a telephony service, and the telecommunications network. The telephony channel may facilitate data communications that are transferred or generated according to telecommunications protocols (e.g., PSTN, POTS, 3G, 4G, EDGE, and VoIP). The telephony service may translate or generate data according to expected packet-switched network protocols, and then transmit the data to the analyst device. Non-limiting examples of the data arriving through the telephony channel may include voice calls, browser activity on the communication application, short-message service messages (i.e., text messages), and interactive voice responses, among others.

Additionally or alternatively, in some cases, the user may use the user device to transmit data or request services via the communication application to a server. In these cases, the server may relay the user communication (e.g., text, call, etc.) to a telephony system, which may transmit the communication to the analyst device over a packet-switched network.

The telephony system may be a computing service executed by the server having processors capable of executing various tasks described herein. The telephony system may execute an interactive voice responses application, which may present to incoming callers, such as the user a series of menu options that the interactive voice responses application uses to determine nature and purpose of a contact. The interactive voice responses application may determine how to route the call of the user based on inputs received from the user device, and then informs the telecommunications network how to appropriately route the call of the user to the analyst. The interactive voice responses application may generate contact data, such as an interactive voice responses record containing information about the call and resulting interactions. This data may be provided over the network to a queue associated with the analyst.

In a next step 304, when the analyst device accepts the call or the text message received from the user device over the telecommunications network, the server may start the electronic communication session between the user device and the analyst device. The server may then instantaneously execute the communication application running on the user device. The communication application may run in a background (e.g., as a service, daemon, etc.) in the user device. The communication application may run as a script on a webpage associated with a company. The communication application may run as a computer program in an operating system on the user device. When the communication application is successfully executed on the user device, the server may automatically trigger a query to the communication application. The query may request for a current location of the user device when the user device is participating in electronic communication session. The communication application may communicate with a location sensor or a GPS navigation device associated with the user device to obtain the current location of the user device. The communication application may receive the current location of the user device from the location sensor or the GPS navigation device. The communication application may transmit the current location of the user device to the server. The server may receive the current location of the user device, and store information associated with the current location of the user device in a database.

The server may determine the user device current location and associated activity continuously, periodically (e.g., once every ten minutes), or as the user's location changes. The current location of the user device may be collected via either a "pull" technique, in which the server may explicitly request the current location of the user device, and the communication application on the user device responsively provides the current location of the user device to the server; or the communication application may actively "push" the current location of the user device to the server without the request from the server.

In a next step 306, the server may search the database using the unique device identifier associated with the user device. The unique device identifier may be a phone number of the user device. The unique device identifier may be a device identification number of the user device. The server may retrieve a user profile of the user from the database, which is associated with the unique device identifier. In one embodiment, the user device may generate the user profile. In another embodiment, the server may generate the user profile based on inputs from the user. The user profile may include a predetermined location associated with the user. The predetermined location may include a workplace of the user. The user profile may further include information associated with the user, such as a name of the user, an age of the user, a gender of the user, accounts of the user, policies of the user, transaction records of the user, hobbies of the user, personal interests of the user, occupation of the user, habits of the user, qualification of the user, social networking accounts of the user, previous contact records of the user, previous requests of the user, recent key activity of the user, and browsing activity of the user.

In a next step 308, the server may execute a matching algorithm to match the current location of the user device with each location in the list of predetermined locations. The matching algorithm may be a computer program. The computer program may include a series of instructions for carrying out an operation, such as matching the current location of the user device with each location in the list of predetermined locations. While step 308 illustrates differing paths based upon matching a location or not matching a location, in some embodiments, step 308 could be modified to differ paths based upon matching a known private location or not matching a known private location (e.g., matching a predetermined public location or not matching a predetermined location at all), as described herein.

In a next step 310, when the current location of the user device may correspond with the predetermined location, the server may select at least one first authentication question from a database. The first authentication question may be used for verification of an identity of the user prior to providing any services to the user during the electronic communication session. For example, when the predefined location is a known public location, the first authentication question may be a question related to non-personal information associated with the user. A non-limiting example of the first authentication question may be a question related to a name of a first school of the user. The server may select the first authentication question for verification of the identity of the user when the user is participating in the electronic communication session from the workplace location because an answer to the first authentication question does not require disclosure of personal and sensitive information of the user, which can be overheard by workplace colleagues of the user that may be around the user during the electronic communication session. The server may transmit a first credentials prompt to the analyst device. A graphical user interface of the analyst device may present the first credentials prompt. The first credentials prompt may include the first authentication question.

The first credentials prompt may prompt the analyst to receive input credentials associated with the first authentication question from the user device. The analyst device may transmit the first authentication question to the user device via the server. The analyst device may receive a first set of purported credentials from the user device in response to the first authentication question via the server. The graphical user interface of the analyst device may display the first set of purported credentials.

In a next step 312, the server may compare the first set of purported credentials inputted in the analyst device with a first set of credentials associated with the user stored within the user profile. The first set of credentials may include a correct answer of the first authentication question, which may be provided by the user while creating the user profile. The server may authenticate the user in response to determining that the first set of purported credentials match with the first set of credentials stored within the user profile. The server may present a result of authentication of the user on the graphical user interface of the analyst device.

When the authentication of the user is successful, the server may generate a first set of offers and products based on information in the user profile and while taking into consideration that the user is currently present in the workplace location. For instance, the server may only include a very few number of offers and products in the first set of offers and products since the user may have a very less time to participate in the electronic communication session. The server may further generate a first set of instructions based on the user profile and while taking into consideration that the user is currently present in the workplace location. The first set of instructions may include rules to be followed by the analyst while communicating with the user during the electronic communication session. The rules may include a time limit for the electronic communication session. The server may transmit the first set of offers and products as well as the first set of instructions to the analyst device. The graphical user interface of the analyst device may display the first set of offers and products as well as the first set of instructions. The analyst may present the first set of offers and products to the user based on the first set of instructions.

In step 314, when the current location of the user device does not match the predetermined location (e.g., the user may be in a moving car) and/or the current location matches a known private predetermined location, the server may select at least one second authentication question from the database. In some embodiments, the privacy of the location may be determined based upon characteristics of the location. For example, a home is typically private, whereas a restaurant or place of work may not be. In some embodiments, sensors of the user device may be used to identify whether the location is private. For example, a microphone of the user device may determine whether multiple people are present at a location (e.g., in a car, in a workplace, in a house) and determine privacy of the location based upon this determination (e.g., when no others present the location may be determined to be private and, otherwise, when others are present, the location may be determined to be non-private).

The second authentication question may be used for the verification of the identity of the user prior to providing any services to the user during the electronic communication session. The second authentication question may be a question related to personal information associated with the user. A non-limiting example of the second authentication question may be a question related to a passport number of the user. The server may select the second authentication question for the verification of the identity of the user when the user is participating in the electronic communication session while driving the car because the user may be able to provide personal information as an answer to the second authentication question without worrying about anyone overhearing the personal information. The server may transmit a second credentials prompt to the analyst device. A graphical user interface of the analyst device may present the second credentials prompt. The second credentials prompt may include a second authentication question.

The second credentials prompt may prompt the analyst to receive input credentials associated with the second authentication question from the user device. The analyst device may transmit the second authentication question to the user device via the server. The analyst device may receive a second set of purported credentials from the user device in response to the second authentication question via the server. The graphical user interface of the analyst device may display the second set of purported credentials.

In a next step 316, the server may compare the second set of purported credentials inputted in the analyst device with a second set of credentials associated with the user stored within the user profile. The second set of credentials may include a correct answer of the second authentication question, which may be provided by the user while creating the user profile. The server may authenticate the user in response to determining that the second set of purported credentials match with the second set of credentials. The server may present a result of authentication of the user on the graphical user interface of the analyst device.

When the authentication of the user is successful, the server may generate a second set of offers and products based on the information in the user profile and while taking into consideration the current location of the user. The second set of offers and products may be different from the first set of offers and products. For instance, the server may include several offers and products in the second set of offers and products since the user may be at home or driving his/her car, and therefore have more time to participate in the electronic communication session. The server may further generate a second set of instructions based on the user profile and while taking into consideration the current location of the user. The second set of instructions may include rules to be followed by the analyst while communicating with the user during the electronic communication session. The rules may include information, which may assist the analyst to conduct a more meaningful conversation with the user. The server may transmit the second set of offers and products as well as the second set of instructions to the analyst device. The graphical user interface of the analyst device may display the second set of offers and products as well as the second set of instructions. The analyst may present the second set of offers and products to the user based on the second set of instructions.

In one non-limiting example, a company may provide a toll-free telephone number to its customers as a convenient means of communicating with them and their various departments, such as customer service and technical support analysts. A customer may place a phone call from his workplace to the toll-free telephone number to reach a call center customer service analyst. The call center receives the phone call. The customer is served over the phone by the customer service analyst. The customer service analyst may authenticate the call. The call authentication may include receiving information from the customer for an authentication question that can be used to determine the customer's identity. Because a call center server determines that the customer is in a more public environment (e.g., at work), the customer service analyst is prompted with a question that does not require the disclosure of very sensitive information that may be overheard by others (e.g., colleagues). The authentication question may include a question related to a name of a first vehicle owned by the customer. When the customer is successfully authenticated, the customer service analyst may provide the services and offer one advertising product to the customer. After the completion of the call, the customer service analyst may update a record of the customer based on the duration and other qualitative factors about the call.

In another non-limiting example, while browsing a website of a company, a customer may encounter a need to speak with a call center analyst. The customer may place a phone call from her home to a toll-free telephone number to reach the call center analyst. The call center receives the phone call. The call center analyst serves the customer over the phone. The call center analyst may authenticate the call. The call authentication may include receiving information from the customer for an authentication question that can be used to determine the customer's identity. Because a server of the call center determines that the customer is in a private setting (e.g., at home), the authentication question may include a question related to a social security number of the user. The call center analyst may provide the services and offer four advertising products to the customer after the customer is authenticated. After the completion of the call, the call center analyst may update a record of the customer based on the duration and other qualitative factors about the call.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   establishing, by a server of a call center, an electronic communication session between a user device operated by a user and an analyst device, wherein the server determines a unique device identifier associated with the user device participating in the electronic communication session;
   upon establishing the electronic communication session, automatically triggering, by the server, a query via a communication application running on the user device for a current location of the user device;
   retrieving, by the server from a database, a user profile associated with the user device having the unique device identifier, wherein the user profile comprises a predetermined location associated with the user;
   determining, by the server, whether the current location of the user device corresponds with the predetermined location within the user profile;
   when the current location of the user device corresponds with the predetermined location within the user profile, transmitting, by the server, a first credentials prompt for display on the analyst device during the electronic communication session;
   when the current location of the user device does not correspond with the predetermined location within the user profile, transmitting, by the server, a second credentials prompt for display on the analyst device during the electronic communication session;
   authenticating, by the server, the user in response to determining that a set of purported credentials inputted in the analyst device in response to the first or the second credentials prompt match a set of credentials stored within the user profile;
   identifying a first set of rules for post-authentication communication during the electronic communication session based upon the current location; and
   providing an indication of the first set of rules for the electronic communication session to the analyst device.

2. The method according to claim 1, further comprising:
   generating, by the server, a first set of offers for the user when the analyst device authenticates the user by matching a first set of responses to a first set of questions presented within the first credentials prompt with at least one predetermined response within the user profile, wherein the first set of offers are associated with the predetermined location; and
   transmitting, by the server, to the analyst device:
     the first set of offers for communicating the first set of offers with the user device during the electronic communication session;
     a first set of instructions to the analyst device for communication of the first set offers to the user device during the electronic communication session, wherein the first set of instructions are associated with the predetermined location; or
     both.

3. The method according to claim 1, comprising:
   determining whether the predetermined location is a public location;
   providing a non-personal prompt as the first credentials prompt when the predetermined location is a public location; and
   providing a personal prompt as the first credentials prompt when the predetermined location is not a public location.

4. The method according to claim 1, further comprising:
   generating, by the server, a second set of offers when the analyst device authenticates the user by matching a second set of responses to a second set of questions presented within the second credentials prompt with at least one predetermined response within the user profile; and
   transmit, by the server, to the analyst device:
     the second set of offers to the analyst device for communicating the second set of offers with the user device during the electronic communication session;
     a second set of instructions to the analyst device for communication of the second set offers with the user device during the electronic communication session; or
     both.

5. A system comprising:
   a server of a call center, comprising a computer processor and tangible, non-transitory machine-readable storage medium comprising machine-readable instructions that, when executed by the computer processor, cause the server to:
     establish an electronic communication session between a user device operated by a user and an analyst device, wherein the server determines a unique device identifier associated with the user device participating in the electronic communication session;
     upon establishing the electronic communication session, automatically trigger a query via a communication application running on the user device for a current location of the user device;
     retrieve from a database a user profile associated with the user device having the unique device identifier, wherein the user profile comprises a predetermined location associated with the user;
     determine whether the current location of the user device corresponds with the predetermined location within the user profile;

when the current location of the user device corresponds with the predetermined location within the user profile, transmit a first credentials prompt for display on the analyst device during the electronic communication session;

when the current location of the user device does not correspond with the predetermined location within the user profile, transmit a second credentials prompt for display on the analyst device during the electronic communication session;

authenticate the user in response to determining that a set of purported credentials inputted in the analyst device in response to the first or the second credentials prompt match a set of credentials stored within the user profile;

identify a first set of rules for post-authentication communication during the electronic communication session based upon the current location; and provide an indication of the first set of rules for the electronic communication session to the analyst device.

6. The system according to claim 5, wherein the server is further configured to:

generate a first set of offers for the user when the analyst device authenticates the user by matching a first set of responses to a first set of questions presented within the first credentials prompt with at least one predetermined response within the user profile.

7. The system according to claim 6, wherein the first set of offers are associated with the predetermined location.

8. The system according to claim 7, wherein the server is further configured to:

transmit the first set of offers to the analyst device for communicating the first set of offers with the user device during the electronic communication session.

9. The system according to claim 8, wherein the server is further configured to:

transmit a first set of instructions to the analyst device for communication of the first set offers to the user device during the electronic communication session.

10. The system according to claim 9, wherein the first set of instructions are associated with the predetermined location.

11. The system according to claim 5, wherein the server is further configured to:

generate a second set of offers when the analyst device authenticates the user by matching a second set of responses to a second set of questions presented within the second credentials prompt with at least one predetermined response within the user profile.

12. The system according to claim 11, wherein the server is further configured to:

transmit the second set of offers to the analyst device for communicating the second set of offers with the user device during the electronic communication session.

13. The system according to claim 12, wherein the server is further configured to:

transmit a second set of instructions to the analyst device for communication of the second set offers with the user device during the electronic communication session.

14. The system according to claim 5, wherein the server is further configured to store the user profile in the database.

15. A tangible, non-transitory, computer-readable medium, comprising computer-readable instructions that, when executed by one or more processors of a computer, cause the computer to:

establish an electronic communication session between a user device operated by a user and an analyst device, wherein a unique device identifier associated with the user device participating in the electronic communication session is determined;

upon establishing the electronic communication session, automatically trigger a query via a communication application running on the user device for a current location of the user device;

retrieve from a database a user profile associated with the user device having the unique device identifier, wherein the user profile comprises a predetermined location associated with the user;

determine whether the current location of the user device corresponds with the predetermined location within the user profile;

when the current location of the user device corresponds with the predetermined location within the user profile, transmit a first credentials prompt for display on the analyst device during the electronic communication session;

when the current location of the user device does not correspond with the predetermined location within the user profile, transmit a second credentials prompt for display on the analyst device during the electronic communication session;

authenticate the user in response to determining that a set of purported credentials inputted in the analyst device in response to the first or the second credentials prompt match a set of credentials stored within the user profile;

identify a first set of rules for post-authentication communication during the electronic communication session based upon the current location; and provide an indication of the first set of rules for the electronic communication session to the analyst device.

16. The tangible, non-transitory, computer-readable medium of claim 15, comprising computer-readable instructions that, when executed by the one or more processors of the computer, cause the computer to:

determine whether the predetermined location is a public location;

provide a non-personal prompt as the first credentials prompt when the predetermined location is a public location; and provide a personal prompt as the first credentials prompt when the predetermined location is not a public location.

17. The tangible, non-transitory, computer-readable medium of claim 15, comprising computer-readable instructions that, when executed by the one or more processors of the computer, cause the computer to:

determine whether the predetermined location is a public location based upon characteristics of the predetermined location, a microphone of the user device used to identify whether persons other than the user are present near the user device, or both.

18. The method according to claim 1, wherein the first set of rules for the electronic communication session comprise a time limit target for the electronic communication session, based upon the current location.

19. The method according to claim 18, comprising:

selecting a list of offers to present based upon the time limit target; and presenting, at the analyst device, the list of offers to present.

20. The method according to claim 1, comprising:
identifying a priority of the electronic communication session with respect to other electronic communication sessions based upon the current location of the user device; and
prioritizing the electronic communication session based upon the priority.

\* \* \* \* \*